(12) United States Patent
Aimono (10) Patent No.: US 9,151,947 B2
(45) Date of Patent: Oct. 6, 2015

(54) OPTICAL DEFLECTOR INCLUDING PIEZOELECTRIC SENSOR INCORPORATED INTO OUTERMOST PIEZOELECTRIC CANTILEVER

(71) Applicant: Stanley Electric Co., Ltd., Tokyo (JP)

(72) Inventor: Takanori Aimono, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 179 days.

(21) Appl. No.: 13/846,028

(22) Filed: Mar. 18, 2013

(65) Prior Publication Data

US 2013/0301103 A1    Nov. 14, 2013

(30) Foreign Application Priority Data

Mar. 23, 2012 (JP) ................................. 2012-066894

(51) Int. Cl.
*G02B 26/08* (2006.01)
*G02B 26/10* (2006.01)
*G02B 26/12* (2006.01)

(52) U.S. Cl.
CPC ............ *G02B 26/08* (2013.01); *G02B 26/0858* (2013.01); *G02B 26/101* (2013.01)

(58) Field of Classification Search
CPC ........... G02B 26/0833; G02B 26/0858; G02B 6/3512; G02B 6/3518; G02B 26/08; G02B 26/0816; G02B 26/101
USPC ............. 359/198.1, 199.1, 208, 223.1, 224.1, 359/224.2, 225.1, 226.1, 226.2, 291, 877, 359/197.1, 199.2, 199.3; 347/260; 369/44.13
See application file for complete search history.

(56) References Cited

U.S. PATENT DOCUMENTS

| | | | |
|---|---|---|---|
| 6,935,759 B1* | 8/2005 | Staker et al. | 359/872 |
| 2002/0026831 A1* | 3/2002 | Behin et al. | 73/514.32 |
| 2004/0183149 A1* | 9/2004 | Schenk | 257/415 |
| 2007/0158552 A1* | 7/2007 | Kim et al. | 250/306 |
| 2007/0273946 A1* | 11/2007 | Kato et al. | 359/199 |
| 2008/0100899 A1* | 5/2008 | Shimokawa et al. | 359/225 |
| 2008/0239446 A1* | 10/2008 | Jung et al. | 359/225 |
| 2009/0180167 A1* | 7/2009 | Tani et al. | 359/198.1 |
| 2009/0237628 A1* | 9/2009 | Furukawa et al. | 353/98 |
| 2010/0118372 A1* | 5/2010 | Usui et al. | 359/221.2 |
| 2010/0245956 A1* | 9/2010 | Terada | 359/200.8 |

(Continued)

FOREIGN PATENT DOCUMENTS

JP      2010-122480 A      6/2010

*Primary Examiner* — Scott J Sugarman
*Assistant Examiner* — Collin X Beatty
(74) *Attorney, Agent, or Firm* — Kenealy Vaidya LLP (57) ABSTRACT

In an optical deflector including a mirror, a movable frame supporting the mirror, a first piezoelectric actuator for rocking the mirror with respect to a first axis of the mirror, a support body supporting the movable frame, and a second piezoelectric actuator for rocking the mirror through the movable frame with respect to a second axis of the mirror, at least one piezoelectric sensor is provided for sensing rocking vibrations of the mirror caused by the first and second piezoelectric actuators. The second piezoelectric actuator includes a pair of meander-type piezoelectric actuators opposite to each other with respect to the first axis. Each of the second meander-type piezoelectric actuators includes a plurality of piezoelectric cantilevers folded at every cantilever and connected from the support body to the movable frame in parallel with the first axis. The piezoelectric sensor is incorporated into an outermost one of the piezoelectric cantilevers.

9 Claims, 9 Drawing Sheets

(56) References Cited

U.S. PATENT DOCUMENTS

| | | | |
|---|---|---|---|
| 2010/0245966 A1* | 9/2010 | Yasuda | 359/224.1 |
| 2010/0296147 A1* | 11/2010 | Terada et al. | 359/224.1 |
| 2011/0032590 A1* | 2/2011 | Terada et al. | 359/199.4 |
| 2011/0122471 A1* | 5/2011 | Terada et al. | 359/199.1 |
| 2011/0292479 A1* | 12/2011 | Hiraoka et al. | 359/199.1 |
| 2012/0026567 A1* | 2/2012 | Murayama et al. | 359/224.1 |
| 2012/0033279 A1* | 2/2012 | Furukawa et al. | 359/199.1 |
| 2012/0320440 A1* | 12/2012 | Kotera et al. | 359/224.1 |
| 2012/0327494 A1* | 12/2012 | Koyama | 359/200.8 |
| 2012/0327495 A1* | 12/2012 | Aimono | 359/224.1 |
| 2013/0050791 A1* | 2/2013 | Nakazono et al. | 359/199.4 |

* cited by examiner

Fig. 9

OPTICAL DEFLECTOR INCLUDING PIEZOELECTRIC SENSOR INCORPORATED INTO OUTERMOST PIEZOELECTRIC CANTILEVER

This application claims the priority benefit under 35 U.S.C. §119 to Japanese Patent Application No. JP2012-066894 filed on Mar. 23, 2012, which disclosure is hereby incorporated in its entirety by reference.

BACKGROUND

1. Field

The presently disclosed subject matter relates to an optical deflector including sense elements (piezoelectric sensors).

2. Description of the Related Art

A prior art two-dimensional optical deflector is constructed by a mirror, a movable frame surrounding the mirror for supporting the mirror, a pair of meander-type inner piezoelectric actuators fixed between the movable frame and the mirror and serving as cantilevers for rocking the mirror with respect to an X-axis of the mirror, a support body surrounding the movable frame, and a pair of meander-type outer piezoelectric actuators fixed between the support body and the movable frame and serving as cantilevers for rocking the mirror through the movable frame with respect to a Y-axis of the mirror perpendicular to the X-axis (see: U.S. Patent Application Publication No. 2011/0292479A1 & JP2010-122480A).

Generally, in an optical scanner, the mirror is rocked with respect to the X-axis for a horizontal deflection at a high frequency, while the mirror is rocked with respect to the Y-axis for a vertical deflection at a low frequency.

In the described prior art two-dimensional optical deflector, each of the piezoelectric actuators includes a drive element and a monitor (sense) element separated from each other by a separation groove. Therefore, when the piezoelectric actuators are driven by their drive elements, the flexing amounts of the piezoelectric actuators are sensed by their sense elements. As a result, the actual flexing amounts of the piezoelectric actuators are controlled by the feedback of the output signals of the sense elements in such a way that the amplitudes of the output signals of the sense elements are brought close to predetermined values. Thus, the deflection of the optical deflector can be controlled with high accuracy.

In the above-described prior art two-dimensional optical deflector, however, since the sense elements are provided in the entire piezoelectric actuators, the provision area of the drive elements in the piezoelectric actuators is decreased so that the rocking forces of the piezoelectric actuators are weakened, thus decreasing the deflection angles of the optical deflector. Also, since long wiring lines are required to be connected to the drive elements and the sense elements, the resistance of the wiring lines is increased. Further, since the two-dimensional optical deflector is conventionally manufactured by the micro electro mechanical system (MEMS) technology, the two-dimensional optical deflector is so fined so that the width of the drive elements and the width of the sense elements are very small, i.e., several hundreds of μm, and also, the spacing between the drive elements and the sense elements is very small. Therefore, the high frequency sense signals from the sense elements cannot be detected due to their crosstalk. As a result, it is impossible to accurately control the actual flexing amounts of the piezoelectric actuators by the feedback of the output signals of the sense elements.

SUMMARY

The presently disclosed subject matter seeks to solve one or more of the above-described problem.

According to the presently disclosed subject matter, in a two-dimensional optical deflector including a mirror, a movable frame supporting the mirror, a first piezoelectric actuator, connected between the movable frame and the mirror, for rocking the mirror with respect to a first axis of the mirror, a support body supporting the movable frame, and a second piezoelectric actuator, connected between the support body and the movable frame, for rocking the mirror through the movable frame with respect to a second axis of the mirror, at least one piezoelectric sensor is provided for sensing rocking vibrations of the mirror caused by the first and second piezoelectric actuators. The second piezoelectric actuator includes a pair of meander-type piezoelectric actuators opposite to each other with respect to the first axis. Each of the second meander-type piezoelectric actuators includes a plurality of piezoelectric cantilevers folded at every cantilever and connected from the support body to the movable frame, and each of the piezoelectric cantilevers is in parallel with the first axis. The piezoelectric sensor is incorporated into an outermost one of the piezoelectric cantilevers of one of the pair of meander-type piezoelectric actuators.

Also, in a one-dimensional optical deflector including a mirror, a support body supporting the mirror, and a piezoelectric actuator, connected between the support body and the mirror, for rocking the mirror with respect to an axis of the mirror, at least one piezoelectric sensor is provided for sensing a rocking vibration of the mirror caused by the piezoelectric actuator. The piezoelectric actuator includes a pair of meander-type piezoelectric actuators opposite to each other with respect to the mirrow. Each of the meander-type piezoelectric actuators includes a plurality of piezoelectric cantilevers folded at every cantilever and connected from the support body to the mirror, and each of the piezoelectric cantilevers is perpendicular to the axis. The piezoelectric sensor is incorporated into an outermost one of the piezoelectric cantilevers of one of the meander-type piezoelectric actuators.

In the above-described optical deflectors, the outermost piezoelectric cantilever includes a lower electrode layer, a first piezoelectric layer formed on the lower electrode, and a first upper electrode layer formed on the first piezoelectric layer. Also, the piezoelectric sensor includes a second piezoelectric layer formed on the lower electrode layer, and a second upper electrode layer formed on the second piezoelectric layer. A width ratio of the second piezoelectric layer to the first piezoelectric layer is from 1/4 to 2/3.

Since the piezoelectric sensor is incorporated into the outermost piezoelectric cantilever, the provision area of the drive portion of the piezoelectric cantilevers in the piezoelectric actuators is increased so that the rocking forces of the piezoelectric actuators are strengthened, thus increasing the deflection angles of the optical deflector. Also, since wiring lines connected to the piezoelectric cantilevers are shortened, the resistance of the wiring lines can be decreased. Further, since the width of the piezoelectric cantilevers can be increased, and also, the spacing therebetween can be increased, the high frequency sense signal from the piezoelectric sensor can be detected due to no crosstalk. As a result, it is possible to accurately control the actual flexing amounts of the piezoelectric actuators by the feedback of the output signal of the piezoelectric sensor.

BRIEF DESCRIPTION OF THE DRAWINGS

The above and other advantages and features of the presently disclosed subject matter will be more apparent from the following description of certain embodiments, taken in conjunction with the accompanying drawings, wherein.

DETAILED DESCRIPTION OF EXEMPLARY EMBODIMENTS

Figure 1:
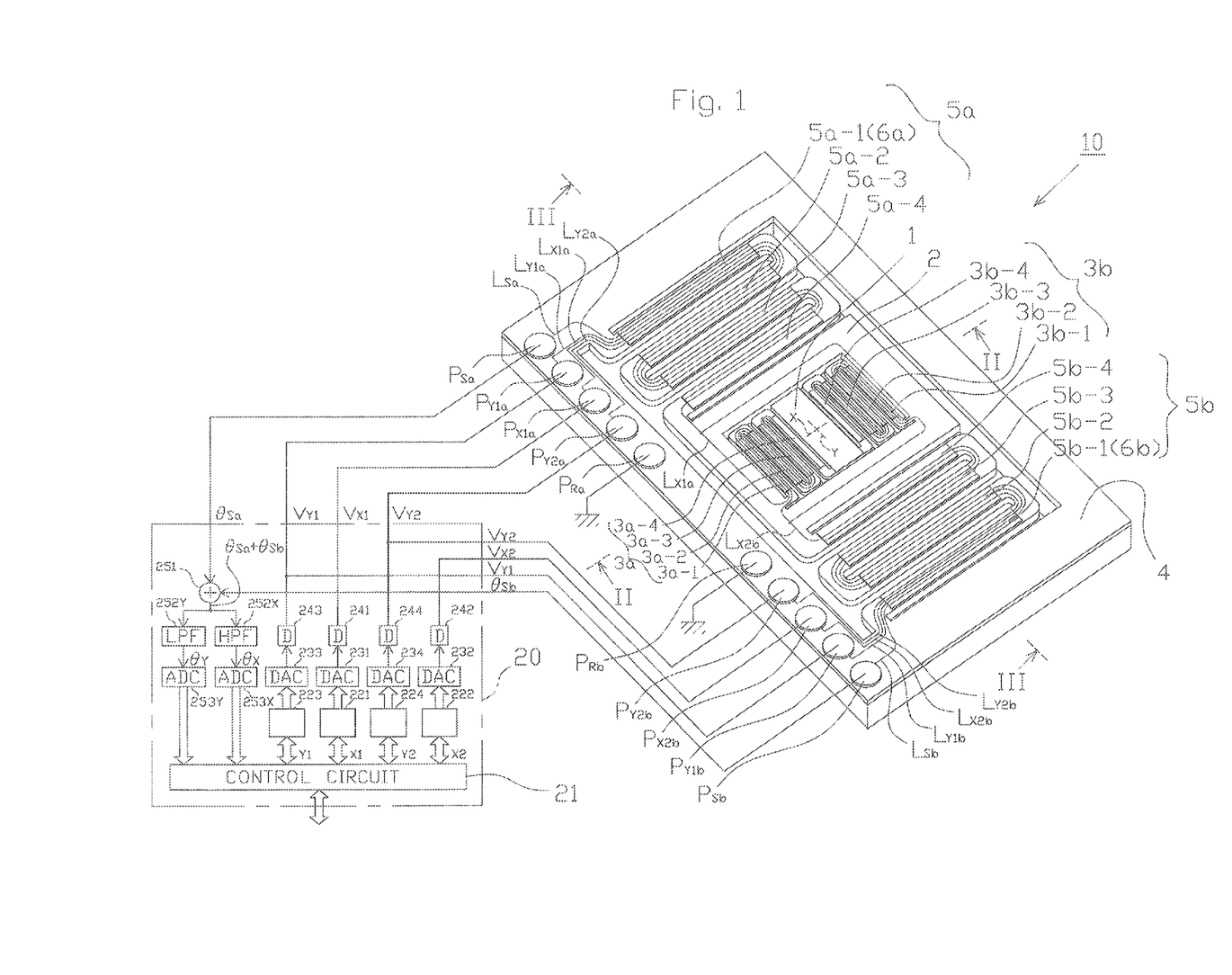
FIG. 1 is a view illustrating a first embodiment of the optical deflector according to the presently disclosed subject matter.

In FIG. 1, which illustrates a first embodiment of the optical deflector according to the presently disclosed subject matter, reference numeral 10 designates a two-dimensional optical deflector, and 20 designates a driver for driving the two-dimensional optical deflector 10.

The optical deflector 10 is constructed by a rectangular mirror 1 for reflecting an incident light, a movable frame 2 surrounding the mirror 1 for supporting the mirror 1, a pair of meander-type inner piezoelectric actuators 3a and 3b fixed between the movable frame 2 and the mirror 1 and serving as cantilevers for rocking the mirror 1 with respect to an X-axis of the mirror 1, a support body 4 surrounding the movable frame 2, and a pair of meander-type outer piezoelectric actuators 5a and 5b fixed betweeen the support body 4 and the movable frame 2 and serving as cantilevers for rocking the mirror 1 through the movable frame 2 with respect to a Y-axis of the mirror 1 perpendicular to the X-axis.

Piezoelectric sensors 6a and 6b are incorporated into the outer piezoelectric actuators 5a and 5b, respectively. This will be explained later.

Note that the Y-axis of the mirror 1 is accurately perpendicular to the X-axis of the mirror 1; however, the Y-axis does not need to be perpendicular to the X-axis.

The movable frame 2 is rectangularly-framed to surround the mirror 1 associated with the inner piezoelectric actuators 3a and 3b.

The inner piezoelectric actuators 3a and 3b oppose each other with respect to the mirror 1. The inner piezoelectric actuators 3a and 3b have ends coupled to the inner circumference of the movable frame 2 and other ends coupled to the mirror 1, in order to rock the mirror 1 with respect to the X-axis.

The inner piezoelectric actuator 3a is constructed by piezoelectric cantilevers 3a-1, 3a-2, 3a-3 and 3a-4 which are serially-coupled from the movable frame 2 to the mirror 1. Also, each of the piezoelectric cantilevers 3a-1, 3a-2, 3a-3 and 3a-4 are in parallel with the Y-axis of the mirror 1. Therefore, the piezoelectric cantilevers 3a-1, 3a-2, 3a-3 and 3a-4 are folded at every cantilever or meandering from the movable frame 2 to the mirror 1, so that the amplitudes of the piezoelectric cantilevers 3a-1, 3a-2, 3a-3 and 3a-4 can be changed along directions perpendicular to the X-axis of the mirror 1.

Similarly, the inner piezoelectric actuator 3b is constructed by piezoelectric cantilevers 3b-1, 3b-2, 3b-3 and 3b-4 which are serially-coupled from the movable frame 2 to the mirror 1. Also, each of the piezoelectic cantilevers 3b-1, 3b-2, 3b-3 and 3b-4 are in parallel with the Y-axis of the mirror 1. Therefore, the piezoelectric cantilevers 3b-1, 3b-2, 3b-3 and 3b-4 are folded at every cantilever or meandering from the movable frame 2 to the mirror 1, so that the amplitudes of the piezoelectric cantilevers 3b-1, 3b-2, 3b-3 and 3b-4 can be changed along directions perpendicular to the X-axis of the mirror 1.

Note that the number of piezoelectric cantilevers in the inner piezoelectric actuator 3a and the number of piezoelectric cantilevers in the inner piezoelectric actuator 3b can be other values such as 2, 6, 8, . . . .

The support body 4 is rectangularly-framed to surround the movable frame 2.

The outer piezoelectric actuators 5a and 5b are coupled between the inner circumference of the support body 4 and the outer circumference of the movable frame 2, in order to rock the movable frame 2 associated with the mirror 1 with respect to the support body 4, i.e., to rock the mirror 1 with respect to the Y-axis.

The outer piezoelectric actuator 5a is constructed by piezoelectric cantilevers 5a-1, 5a-2, 5a-3 and 5a-4 which are serially-coupled from the movable frame 2 to the support body 4. Also, each of the piezoelectric cantilevers 5a-1, 5a-2, 5a-3 and 5a-4 are in parallel with the X-axis of the mirror 1. Therefore, the piezoelectric cantilevers 5a-1, 5a-2, 5a-3 and 5a-4 are folded at every cantilever or meandering from the support body 4 to the movable frame 2, so that the amplitudes of the piezoelectric cantilevers 5a-1, 5a-2, 5a-3 and 5a-4 can be changed along directions perpendicular to the Y-axis of the mirror 1.

Similarly, the outer piezoelectric actuator 5b is constructed by piezoelectric cantilevers 5b-1, 5b-2, 5b-3 and 5b-4 which are serially-coupled from the movable frame 2 to the support body 4. Also, each of the piezoelectric cantilevers 5b-1, 5b-2, 5b-3 and 5b-4 are in parallel with the X-axis of the mirror 1. Therefore, the piezoelectric cantilevers 5b-1, 5b-2, 5b-3 and 5b-4 are folded at every cantilever or meandering from the support body 5 to the movable frame 2, so that the amplitudes of the piezoelectric cantilevers 5b-1, 5b-2, 5b-3 and 5b-4 can be changed along directions perpendicular to the Y-axis of the mirror 1.

Note that the number of piezoelectric cantilevers in the outer piezoelectric actuator 5a and the number of piezoelectric cantilevers in the outer piezoelectric actuator 5b can be other values such as 2, 6, 8, . . . .

The piezoelectric sensors 6a and 6b are incorporated into the outermost piezoelectric cantilevers 5a-1 and 5b-1, respectively, and sense deflection angle signals $\theta_{Sa}$ and $\theta_{Sb}$, respectively, of the mirror 1.

Provided on the support body 4 are pads $P_{Ra}$, $P_{Y2a}$, $P_{X1a}$, $P_{Y1a}$ and $P_{Sa}$, $P_{Rb}$, $P_{Y2b}$, $P_{X2b}$, $P_{Y1b}$ and $P_{Sb}$. The pads $P_{Y2a}$, $P_{X1a}$, $P_{Y1a}$, $P_{Sa}$, $P_{Y2b}$, $P_{X2b}$, $P_{Y1b}$ and $P_{Sb}$ are connected to the driver 20.

Figure 2:
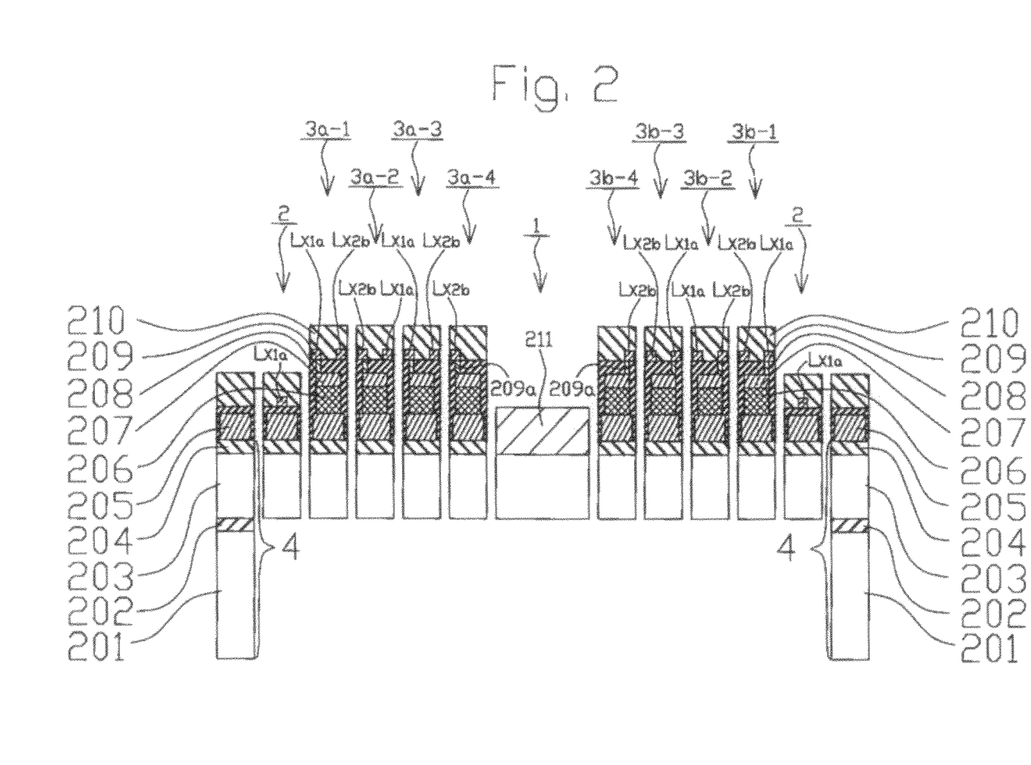
FIG. 2 is a cross-sectional view taken along the line II-II in FIG. 1.
Figure 3:
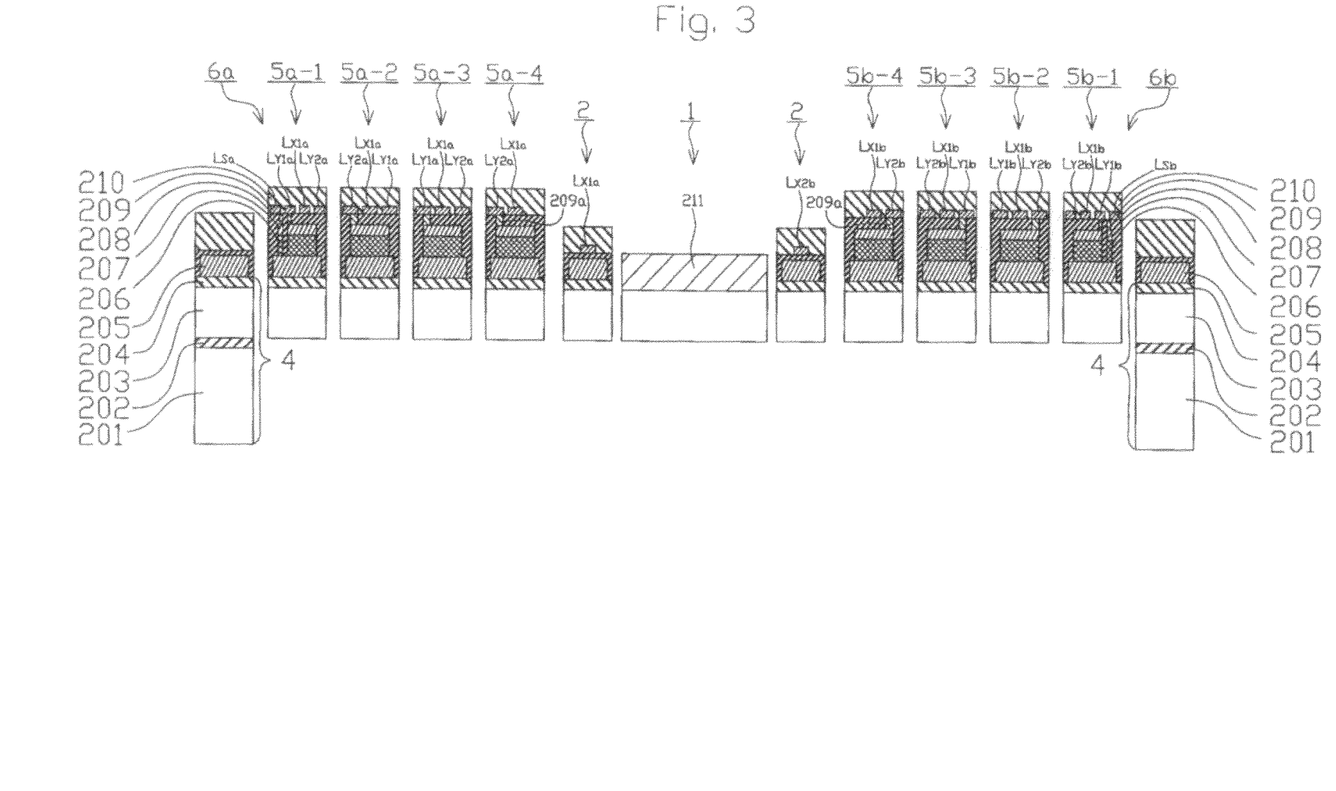
FIG. 3 is a cross-sectional view taken along the line III-III in FIG. 1.

The pad $P_{Rb}$ for receiving a reference voltage $V_R$ is connected via via-structures (not shown) to the lower electrode layers 207 (see: FIG. 2) of the piezoelectric cantilevers 3a-1, 3a-2, 3a-3 and 3a-4 of the inner piezoelectric actuator 3a, the lower electrode layers 205 (see: FIG. 3) of the piezoelectric cantilevers 5a-1, 5a-2, 5a-3 and 5a-4 of the outer piezoelectric actuator 5a, and the lower electrode layer 205 (see: FIG. 3) of the piezoelectric sensor 6a. In this case, the pad $P_{Ra}$ is grounded, i.e., the reference voltage $V_R$ is 0V.

The pad $P_{Y2a}$ is connected via a wiring line $L_{Y2a}$ to the upper electrode layers 207 (see: FIG. 3) of the even-numbered piezoelectric cantilevers 5a-2 and 5a-4 of the outer piezoelectric actuator 5a.

The pad $P_{X1a}$ is connected via a wiring line $L_{X1a}$ to the upper electrode layers 207 (see: FIG. 2) of the odd-numbered piezoelectric cantilevers 3a-1 and 3a-3 of the inner piezoelectric actuator 3a and the upper electrode layers 207 (see: FIG. 2) of the odd-numbered piezoelectric cantilevers 3a-1 and 3a-3 of the inner piezoelectric actuator 3b.

The pad $P_{Y1a}$ is connected via a wiring line $L_{Y1a}$ to the upper electrode layers 207 (see: FIG. 3) of the odd-numbered piezoelectric cantilevers 5a-1 and 5a-3 of the outer piezoelectric actuator 5a.

The pad $P_{Sa}$ is connected via a wiring line $L_{Sa}$ to the upper electrode layer 207 (see: FIG. 3) of the piezoelectric sensor 6a incorporated into the outermost piezoelectric cantilever 5a-1. In this case, the upper electrode layer 207 for the piezoelectric sensor 6a is electrically isolated from the upper electrode layer 207 for the body of the piezoelectric cantilever 5a-1 of the outer piezoelectric actuator 5a.

The pad $P_{Rb}$ for receiving the reference voltage $V_R$ is connected via via-structures (not shown) to the lower electrode layers 205 (see: FIG. 2) of the piezoelectric cantilevers 3 b-1, 3 b-2, 3 b-3 and 3 b-4 of the inner piezoelectric actuator 3 b, the lower electrode layers 205 (see: FIG. 3) of the piezoelectric cantilevers 5 b-1, 5 b-2, 5 b-3 and 5 b-4 of the outer piezoelectric actuator 5 b, and the lower electrode layer 205 (see: FIG. 3) of the piezoelectric sensor 6 b. In this case, since the reference voltage $V_R$ is 0V, the pad $P_{Rb}$ is grounded.

The pad $P_{Y2b}$ is connected via a wiring line $L_{Y2b}$ to the upper electrode layers 207 (see: FIG. 3) of the even-numbered piezoelectric cantilevers 5b-2 and 5b-4 of the outer piezoelectric actuator 5b.

The pad $P_{X1b}$ is connected via a wiring line $L_{X1b}$ to the upper electrode layers 207 (see: FIG. 2) of the even-numbered piezoelectric cantilevers 3a-2 and 3a-4 of the inner piezoelectric actuator 3a and the upper electrode layers 207 (see: FIG. 3) of the even-numbered piezoelectric cantilevers 3b-2 and 3b-4 of the inner piezoelectric actuator 3b.

The pad $P_{Y1b}$ is connected via a wiring line $L_{Y1b}$ to the upper electrode layers 207 (see: FIG. 3) of the odd-numbered piezoelectric cantilevers 5a-1 and 5a-3 of the outer piezoelectric actuator 5b.

The pad $P_{Sb}$ is connected via a wiring line $L_{Sb}$ to the upper electrode layer 207 (see: FIG. 3) of the piezoelectric sensor 6b incorporated into the outermose piezoelectric cantilever 5b-1. In this case, the upper electrode layer 207 for the piezoelectric sensor 6b is electrically isolated from the upper electrode layer 207 for the body of the piezoelectric cantilever 5b-1 of the outer piezoelectric actuator 5b.

The driver 20 is constructed by a control circuit 21 such as a microcomputer including a central processing unit (CPU), a read-only memory (ROM) or a nonvolatile memory, a random access memory (RAM), an input/output (I/O) interface and the like.

The driver 20 includes a nonvolatile memory 221 for storing drive data X1 for driving the upper electrode layers of the odd-numbered piezoelectric cantilevers 3a-1 and 3a-3; 3b-1 and 3b-3, a digital-to-analog converter (DAC) 231 for converting the drive data X1 into a drive voltage $V_{X1}$, and a drive circuit 241 for applying the drive voltage $V_{X1}$ to the pad $P_{X1a}$.

The driver 20 further includes a nonvolatile memory 222 for storing drive data X2 for driving the upper electrode layers of the even-numbered piezoelectric cantilevers 3a-2 and 3a-4; 3b-2 and 3b-4, a digital-to-analog converter (DAC) 232 for converting the drive data X2 into a drive voltage $V_{X2}$, and a drive circuit 242 for applying the drive voltage $V_{X2}$ to the pad $P_{X2b}$.

The driver 20 further includes a nonvolatile memory 223 for storing drive data Y1 for driving the upper electrode layers of the odd-numbered piezoelectric cantilevers 5a-1 and 5a-3; 5b-1 and 5b-3, a digital-to-analog converter (DAC) 233 for converting the drive data Y1 into a drive voltage $V_{Y1}$, and a drive circuit 243 for applying the drive voltage $V_{Y1}$ to the pads $P_{Y1a}$ and $P_{Y1b}$.

The driver 20 further includes a nonvolatile memory 224 for storing drive data Y2 for driving the upper electrode layers of the even-numbered piezoelectric cantilevers 5a-2 and 5a-4; 5b-2 and 5b-4, a digital-to-analog converter (DAC) 234 for converting the drive data Y2 into a drive voltage $V_{Y2}$, and a drive circuit 244 for applying the drive voltage $V_{Y2}$ to the pads $P_{Y2a}$ and $P_{Y2b}$.

The driver 20 further includes a summing amplifier 251 for amplifying the sum of the analog deflection angle signals $\theta_{Sa}$ and $\theta_{Sb}$ of the mirror 1 from the pads $P_{Sa}$ and $P_{Sb}$, a high pass filter (HPF) (or a band pass filter (BPF)) 252X for passing a frequency component $f_X$ of the analog deflection angle signals $\theta_{Sa}$ and $\theta_{Sb}$ to generate an analog deflection angle $\theta_X$ excluding the frequency component $f_Y$, a low pass filter (LPF) (or a band pass filter (BPF)) 252Y for passing a frequency component $F_Y$ of the analog deflection angle signals $\theta_{Sa}$ and $\theta_{Sb}$ to generate an analog deflection angle signal $\theta_Y$ excluding the frequency component $f_X$, and analog-to-digital converters (ADC) 253X and 253Y for converting the analog deflection angle signals $\theta_X$ and $\theta_Y$ into digital deflection angle data.

As stated above, the piezoelectric sensors 6a and 6b are incorporated into the outermost piezoelectric cantilevers 5a-1 and 5b-1, respectively, of the outer piezoelectric actuators 5a and 5b, so that the piezoelectric sensors 6a and 6b could be easily flexed by the outer piezoelectric actuators 5a and 5b. Therefore, the analog deflection angle signals $\theta_{Sa}$ and $\theta_{Sb}$ mainly include the frequency component $f_Y$ such as 60 Hz caused by the outer piezoelectric actuators 5a and 5b; however, even in this case, small amounts of the frequency component $f_X$ such as 30 kHz caused by the inner piezoelectric actuators 3a and 3b would propagate via the movable frame 2 to the piezoelectric sensors 6a and 6b, so that the piezoelectric sensors 6a and 6b would also be flexed by the inner piezoelectric actuators 3a and 3b. Therefore, each of the analog deflection angle signals $\theta_{Sa}$ and $\theta_{Sb}$ can be represented by $$\theta_{Sa} \propto \theta_X + \theta_Y$$

$$\theta_{Sb} \propto \theta_X + \theta_Y$$

Therefore, the high pass filter 252X can generate the analog deflection angle signal $\theta_X$ whose amplitude is relatively small and the low pass filter 252Y can generate the analog deflection angle signal $\theta_Y$ whose amplitude is relatively large.

The structure of each element of the optical deflector 10 is explained next with reference to FIGS. 2 and 3 which are cross-sectional views taken along the II-II line and the III-III line, respectively, in FIG. 1.

In FIGS. 2 and 3, a monocrystalline silicon support layer 201, an intermediate silicon dioxide layer 202 and a monocrystalline silicon active layer 203 are formed by a silicon-on-insulator (SOI) substrate. Also, reference numeral 204 designates a silicon dioxide layer, 205 designates a lower electrode layer of a double layer made of Ti, $TiO_2$ or $TiO_x$ ($0<x<2$) and Pt, LaNiO$_3$ or SrRuO$_3$, 206 designates a lead titanate zirconate (PZT) layer, 207 designates an upper electrode layer made of Pt, Au or the like, 208 designates an insulating interlayer made of silicon dioxide or the like, 209 designates a wiring layer made of Pt, Au, Al or aluminum alloy, 209a designates a via-structure within the insulating layer 208 for electrically connecting the wiring layer 209 to the upper electrode layer 207, 210 designates a passivation layer made of silicon dioxide and/or silicon nitride, and 211 designates an about 100 to 500 nm metal layer made of Al, Ag, Au, Pt or the like.

The mirror 1 is constructed by the monocrystalline silicon active layer 203 serving as a vibration plate and the metal layer 211 serving as a reflector.

The movable frame 2 is constructed by the monocrystalline silicon active layer 203 and the silicon dioxide layer 204.

Each of the piezoelectric cantilevers 3a-1 to 3a-4 and 3b-1 to 3b-4 and the piezoelectric cantilevers 5a-1 to 5a-4 and 5b-1 to 5b-4 and the piezoelectric sensors 6a and 6b is constructed by the monocrystalline silicon active layer 203, the silicon dioxide layer 204, the lower electrode layer 205, the PZT layer 206 and the upper electrode layer 207.

The support body 4 is constructed by the monocrystalline silicon layer 201, the intermediate silicon dioxide layer 202, the monocrystalline silicon active layer 203 and the silicon dioxide layer 204.

The pads $P_{Ra}$, $P_{Y2a}$, $P_{X1a}$, $P_{Y1a}$, $P_{Sa}$, $P_{Rb}$, $P_{Y2b}$, $P_{X2b}$, $P_{Y1b}$ and $P_{Sb}$ and the wiring lines $L_{Y2a}$, $L_{X1a}$, $L_{Y1a}$, $L_{Sa}$, $L_{Y2b}$, $L_{X2b}$, $L_{Y1b}$ and $L_{Sb}$ are constructed by the wiring layer 209.

The meander-type piezoelectric actuators 3a, 3b, 5a and 5b are described below.

In the inner piezoelectric actuators 3a and 3b, the piezoelectric cantilevers 3a-1, 3a-2, 3a-3, 3a-4, 3b-1, 3b-2, 3b-3 and 3b-4 are divided into an odd-numbered group of the piezoelectric cantilevers 3a-1 and 3a-3; 3b-1 and 3b-3, and an even-numbered group of the piezoelectric cantilevers 3a-2 and 3a-4; 3b-2 and 3b-4 alternating with the odd-numbered group of the inner piezoelectric cantilevers 3a-1 and 3a-3; 3b-1 and 3b-3.

Similarly, in the outer piezoelectric actuators 5a and 5b, the piezoelectric cantilevers 5a-1, 5a-2, 5a-3, 5a-4, 5b-1, 5b-2, 5b-3 and 5b-4 are divided into an odd-numbered group of the piezoelectric cantilevers 5a-1 and 5a-3; 5b-1 and 5b-3, and an even-numbered group of the piezoelectric cantilevers 5a-2 and 5a-4; 5b-2 and 5b-4 alternating with the odd-numbered group of the outer piezoelectric cantilevers 5a-1 and 5a-3; 5b-1 and 5b-3.

Figure 4A:
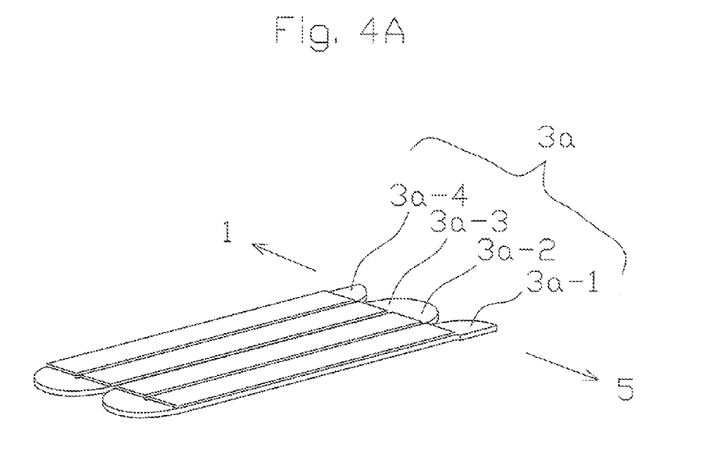
FIGS. 4A and 4B are perspective views for explaining a non-operation state and an operation state, respectively, of the piezoelectric cantilevers of one piezoelectric actuator of FIG. 1.
Figure 4B:
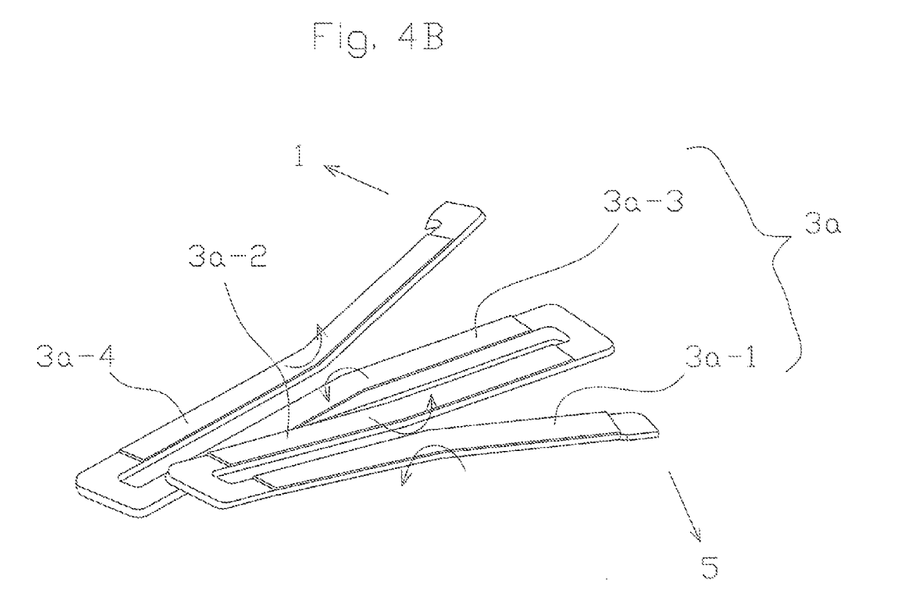

FIGS. 4A and 4B are perspective views for explaining the operation of the piezoelectric cantilevers of one piezoelectric actuator such as 3a of FIG. 1. Note that FIG. 4A illustrates a non-operation state of the piezoelectric cantilevers 3a-1, 3a-2, 3a-3 and 3a-4 of the piezoelectric actuator 3a, and FIG. 4B illustrates an operation state of the piezoelectric cantilevers 3a-1, 3a-2, 3a-3 and 3a-4 of the piezoelectric actuator 3a.

For example, as illustrated in FIG. 4B which illustrates only the piezoelectric cantilevers 3a-1, 3a-2, 3a-3 and 3a-4, when the odd-numbered group of the piezoelectric cantilevers 3a-1, 3a-3, 3b-1 and 3b-3 are flexed in one direction, for example, in a downward direction, the even-numbered group of the piezoelectric cantilevers 3a-2, 3a-4, 3b-2 and 3b-4 are flexed in the other direction, i.e., in an upward direction. On the other hand, when the odd-numbered group of the piezoelectric cantilevers 3a-1, 3a-3, 3b-1 and 3b-3 are flexed in the upward direction, the even-numbered group of the piezoelectric cantilevers 3a-2, 3a-4, 3b-2 and 3b-4 are flexed in the downward direction.

The operation of the piezoelectric cantilevers 5a-1, 5a-2, 5a-3, 5a-4, 5b-1, 5b-2, 5b-3 and 5b-4 is similar to that of the piezoelectric cantilevers 3a-1, 3a-2, 3a-3, 3a-4, 3b-1, 3b-2, 3b-3 and 3b-4. Thus, the mirror 1 is rocked with respect to the Y-axis.

An optical deflection or horizontal scanning operation by rocking the mirror 1 with respect to the X-axis and an optical deflection or vertical scanning operation by rocking the mirror 1 with respect to the Y-axis are explained in detail with reference to FIGS. 5A, 5B, 5C, 5D and 5E.

Figure 5A:
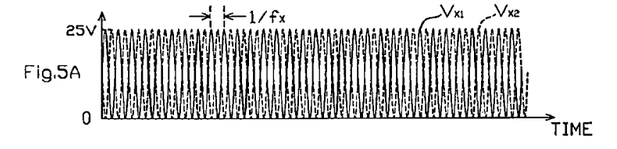
FIGS. 5A, 5B, 5C, 5D and 5E are timing diagrams for illustrating examples of the drive voltages $V_{X1}$ and $V_{X2}$, the drive voltages $V_{Y1}$ and $V_{Y2}$, the sense signal $\theta_{sa}+\theta_{sb}$, the deflection angle signal $\theta_X$, and the deflection angle signal $\theta_Y$, respectively, of FIG. 1.

As illustrated in FIG. 5A, the drive voltage $V_{X1}$ based upon the drive data X1 stored in advance in the nonvolatile memory 221 and the drive voltage $V_{X2}$ based upon the drive data X2 stored in advance in the nonvolatile memory 222 are sinusoidal at a predetermined frequency $f_X$ such as 15 kHz and symmetrical or opposite in phase to each other with the reference voltage $V_R$ such as 0V. As a result, the piezoelectric cantilevers 3a-1, 3a-3, 3b-1 and 3b-3 and the piezoelectric cantilevers 3a-2, 3a-4, 3b-2 and 3b-4 carry out flexing operations in opposite directions to each other, so that the mirror 1 is rocked with respect to the X-axis. Note that the drive voltages $V_{X1}$ and $V_{X2}$ have an amplitude of 12.5V (peak-to-peak voltage 25V), for example.

Figure 5B:
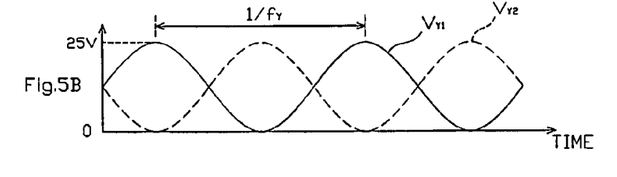

Also, as illustrated in FIG. 5B, the drive voltage $V_{Y1}$ based upon the drive data Y1 stored in advance in the nonvolatile memory 223 and the drive voltage $V_{Y2}$ based upon the drive date Y2 stored in advance in the nonvolatile memory 224 are sinusoidal at a predeterined frequency $f_Y$ such as 60 Hz and symmetrical or opposite in phase to each other with the reference voltage $V_R$ such as 0V. As a result, the piezoelectric cantilevers 5a-1, 5a-3, 5b-1 and 5b-3 and the piezoelectric cantilevers 5a-2, 5a-4, 5b-2 and 5b-4 carry out flexing operations in opposite directions to each other, so that the mirror 1 is rocked with respect to the Y-axis. Note that the drive voltages $V_{Y1}$ and $V_{Y2}$, have an amplitude of 12.5V (peak-to-peak voltage 25V), for example.

Figure 5C:
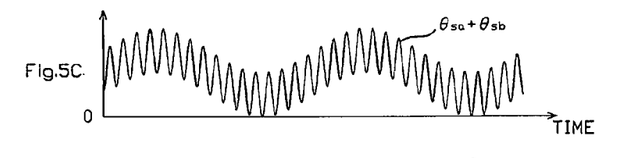

Thus, the sense deflection angle signals $\theta_{Sa}$ and $\theta_{Sb}$ of the piezoelectric sensors 6a and 6b are obtained in the summing amplifier 251 as an analog deflection signal $\theta_{Sa}+\theta_{Sb}$, as illustrated in FIG. 5C.

Figure 5D:
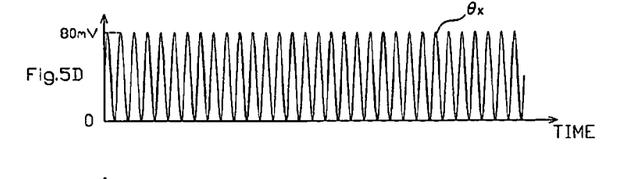

In this case, as illustrated in FIG. 5D, the analog deflection angle signal $\theta_X$ of the high pass filter 252X included in the analog deflection angle signals $\theta_{Sa}$ and $\theta_{Sb}$ has a small amplitude $A_X$ such as 40 mV (peak-to-peak voltage 80 mV). Note that the analog deflection angle signal $\theta_X$ is synchronized with an actual deflection angle signal $P_X$ having an amplitude $A_{X0}$ detected by using a one-dimensional position sensitive detector (PSD) which detects a center of a light spot reflected from the mirror 1, so that a definite relationship between the amplitude $A_X$ of the analog deflection angle signal $\theta_X$ and the amplitude $A_{X0}$ of the actual deflection angle signal $P_X$ is realized and such a relationship is stored in a nonvolatile memory of the control circuit 21 in advance. Also, the one-dimensional PSD is removed in a usual operation mode.

The control circuit 21 rewrites the drive data X1 and X2 to change the amplitudes of the drive voltages $V_{X1}$ and $V_{X2}$ in such a way that the amplitude $A_X$ of the deflection angle signal $\theta_X$ is brought close to a predetermined value corresponding to a predetermined actual deflection angle.

Figure 5E:
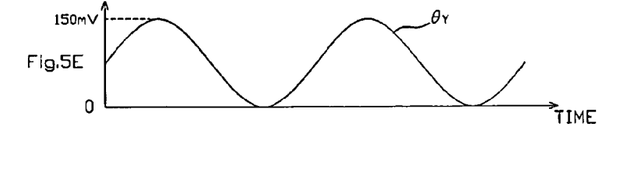

Also, as illustrated in FIG. 5E, the analog deflection angle signal $\theta_Y$ of the low pass filter 252Y included in the analog deflection angle signals $\theta_{Sa}$ and $\theta_{Sb}$ has a large amplitude $A_Y$ such as 75 mV (peak-to-peak voltage 50 mV). Note that the analog deflection angle signal $\theta_Y$ is synchronized with an actual deflection angle signal $P_Y$ having an amplitude $A_{Y0}$ detected by using a one-dimensional position sensitive detector (PSD) which detects a center of light spot reflected from the mirror 1, so that a definite relationship between the amplitude $A_Y$ of the analog deflection angle signal $\theta_Y$ and the amplitude $A_{Y0}$ of the actual deflection angle signal $P_Y$ is realized and such a relationship is stored in a nonvolatile memory of the control circuit 21 in advance. Also, the one-dimensional PSD is removed in a usual operation mode.

The control circuit 21 rewrites the drive data Y1 and Y2 to change the amplitudes of the drive voltages $V_{Y1}$ and $V_{Y2}$ in such a way that the amplitude $A_Y$ of the deflection angle signal $\theta_Y$ is brought close to a predetermined value corresponding to a predetermined actual deflection angle.

In the above-described first embodiment, the meander-type piezoelectric actuators 3a and 3b are smaller in size than the meander-type piezoelectric actuators 5a and 5b, so that the meander-type piezoelectric actuators 3a and 3b are easily flexed at a higher frequency than the meander-type piezoelectric actuators 5a and 5b. Thus, the rocking frequency $f_X$ caused by the meander-type piezoelectric actuators 3a and 3b is larger than the rocking frequency $f_Y$ caused by the meander-type piezoelectric actuators 5a and 5b. Particularly, if the rocking frequency $f_X$ of the meander-type piezoelectric actuators 3a and 3b is close to the natural frequency of a mechanically-vibrating system of the mirror 1 with respect to the X-axis depending upon the structure of the inner piezoelectric actuators 3a and 3b, the deflection angle of the mirror 1 with respect to the X-axis can be increased.

Also, the drive voltages $V_{X1}$ and $V_{X2}$ and the drive voltages $V_{X1}$ and $V_{X2}$ can be saw-tooth-shaped.

The piezoelectric sensor 6a (6b) incorporated into the outermost piezoelectric cantilever 5a-1 (5b-1) is discussed in detail with reference to FIG. 6 which is an enlarged cross-sectional view of the outermost piezoelectric cantilever 5a-1 of FIG. 3. Note that outermost piezoelectric cantilever 5b-1 has a similar configuration to that of the outermost piezoelectric cantilever 5a-1.

Figure 6:
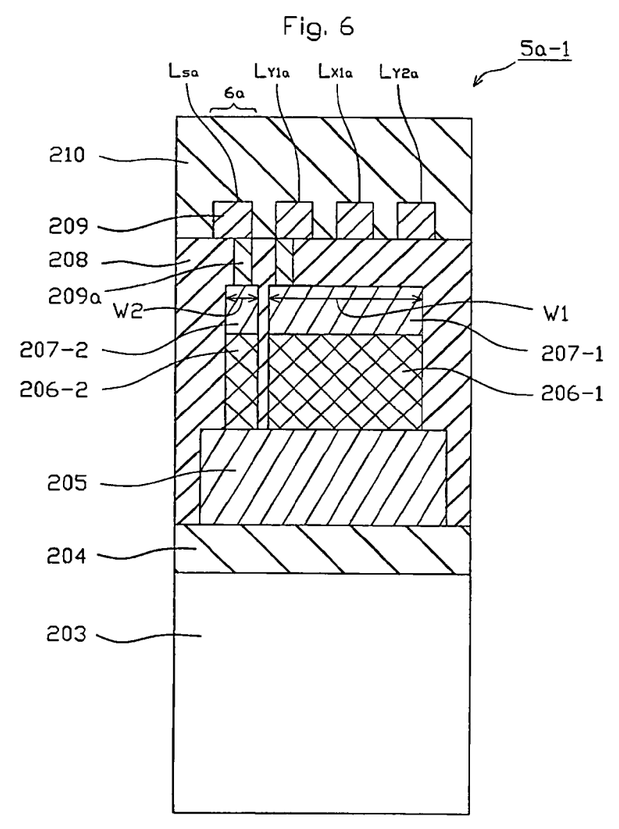
FIG. 6 is an enlarged cross-sectional view of the outermost piezoelectric cantilever of FIG. 3.

As illustrated FIG. 6, a PZT layer 206-1 and the upper electrode layer 207-1 for the body of the outermost piezoelectric cantilever 5a-1 are electrically-isolated from the PZT layer 206-2 and the upper electrode layer 207-2 for the piezoelectric sensor 6a by the insulating layer 208. In this case, since the width of the insulating layer 208 between the layer 206-1 (207-1) and the layer 206-2 (207-2) is much smaller than the width W1 of the layer 206-1 (207-1) and the width W2 of the layer 206-2 (207-2), the width of the insulating layer 208 therebetween can be neglected.

In FIG. 6, a PZT layer width ratio of the width W2 of the PZT layer 206 of the piezoelectric sensor 6a to the width W1 of the PZT layer 206 of the body of the piezoelectric cantilever 5a-1 is caused to be $$W2/(W1+W2)=0.3$$

$$\therefore W2/W1=3/7$$

The larger the PZT layer width ratio W2/W1, the smaller the flexing force of the body of the outermost piezoelectric cantilever 5a-1. In other words, the smaller the amplitude of the deflection angle signal of the piezoelectric sensor 6a, the larger the PZT layer width ratio W2/W1, as illustrated in FIG. 7.

Figure 7:
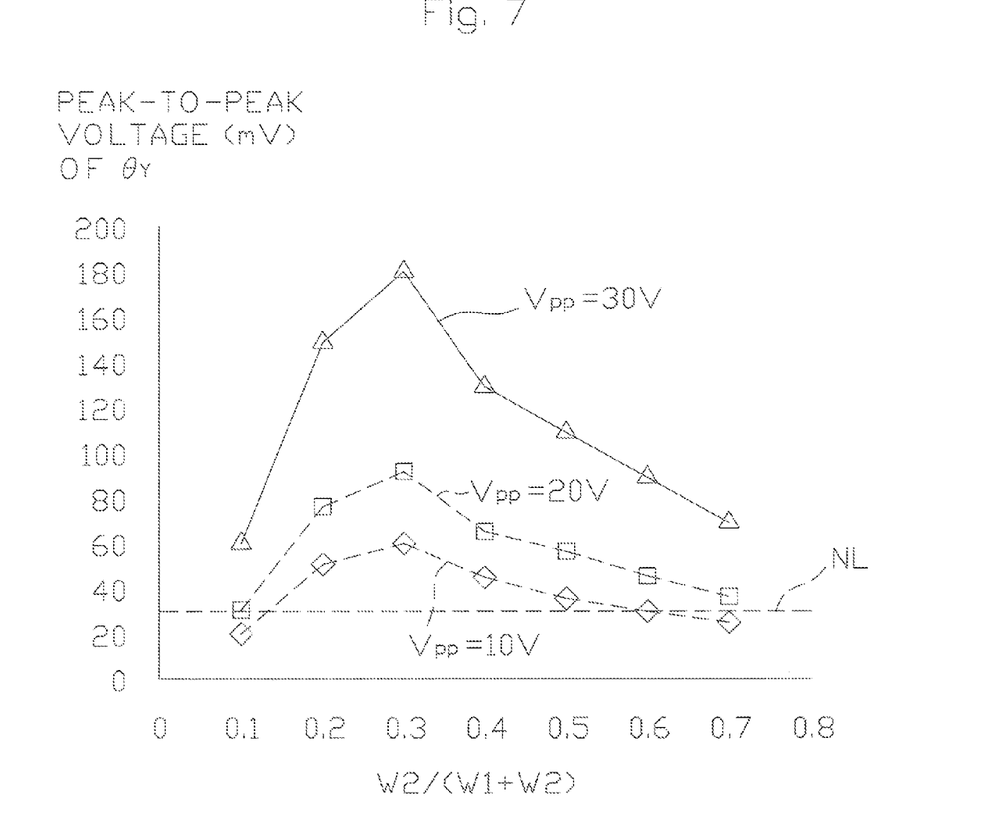
FIG. 7 is a graph showing the PZT layer ratio characteristics of the outermost piezoelectric actuator of FIG. 1.

In FIG. 7, when the peak-to-peak voltage $V_{pp}$ of the sinusoidal drive voltages $V_{X1}$, $V_{X2}$, $V_{Y1}$, and $V_{Y2}$ is 10V, 20V and 30V, the deflection angle signal $\theta_Y$ is higher in the ratio W2/(W1+W2) of 0.2 to 0.4 than the noise level such as 30 mV defined by power supply sources and the like. In this case, if W2/(W1+W2)=0.2, W2/W1=1/4, and if W2/(W1+W2)=0.4, W2/W1=2/3. Therefore, the PZT layer width ratio W2/W1 is preferably from 1/4 to 2/3 in order for the deflection angle signals $\theta_X$ and $\theta_Y$ to be higher than the noise level.

In the first embodiment, since the wiring lines $L_{Sa}$ and $L_{Sb}$ for the piezoelectric sensors 6a and 6b are shorter than the wiring lines $L_{X1a}$, $L_{Y1a}$, $L_{Y2a}$, $L_{X1b}$, $L_{Y1b}$ and $L_{Y2b}$ for the piezoelectric actuators 3a, 3b, 5a and 5b, the crosstalk therebetween can be decreased, so that the piezoelectric sensors 6a and 6b can accurately sense the deflection of the mirror 1.

Also, since the number of wiring layers of the other piezoelectric cantilevers 5a-2, 5a-3, 5a-4, 5b-2, 5b-3 and 5b-4 can be decreased, the two-dimensional optical deflector of FIG. 1 can be decreased in size, and the manufacturing yield can be increased. Otherwise, the number of piezoelectric cantilevers of the two-dimensional optical deflector of FIG. 1 can be increased to increase the flexing amount thereof.

In FIG. 3, the width of the PZT layer 206 of the piezoelectric cantilevers 5a-2, 5a-3, 5a-4, 5b-2, 5b-3 and 5b-4 is smaller than the width of the PZT layer 206 of the bodies of the outermost piezoelectric cantilevers 5a-1 and 5b-1; however, the width of the PZT layers 206 of the piezoelectric cantilevers 5a-2, 5a-3, 5a-4, 5b-2, 5b-3 and 5b-4 can be the same as that of the PZT layers 206 of the bodies of the outermost piezoelectric cantilevers 5a-1 and 5b-1, thus harmonizing the flexing operation.

Figure 8:
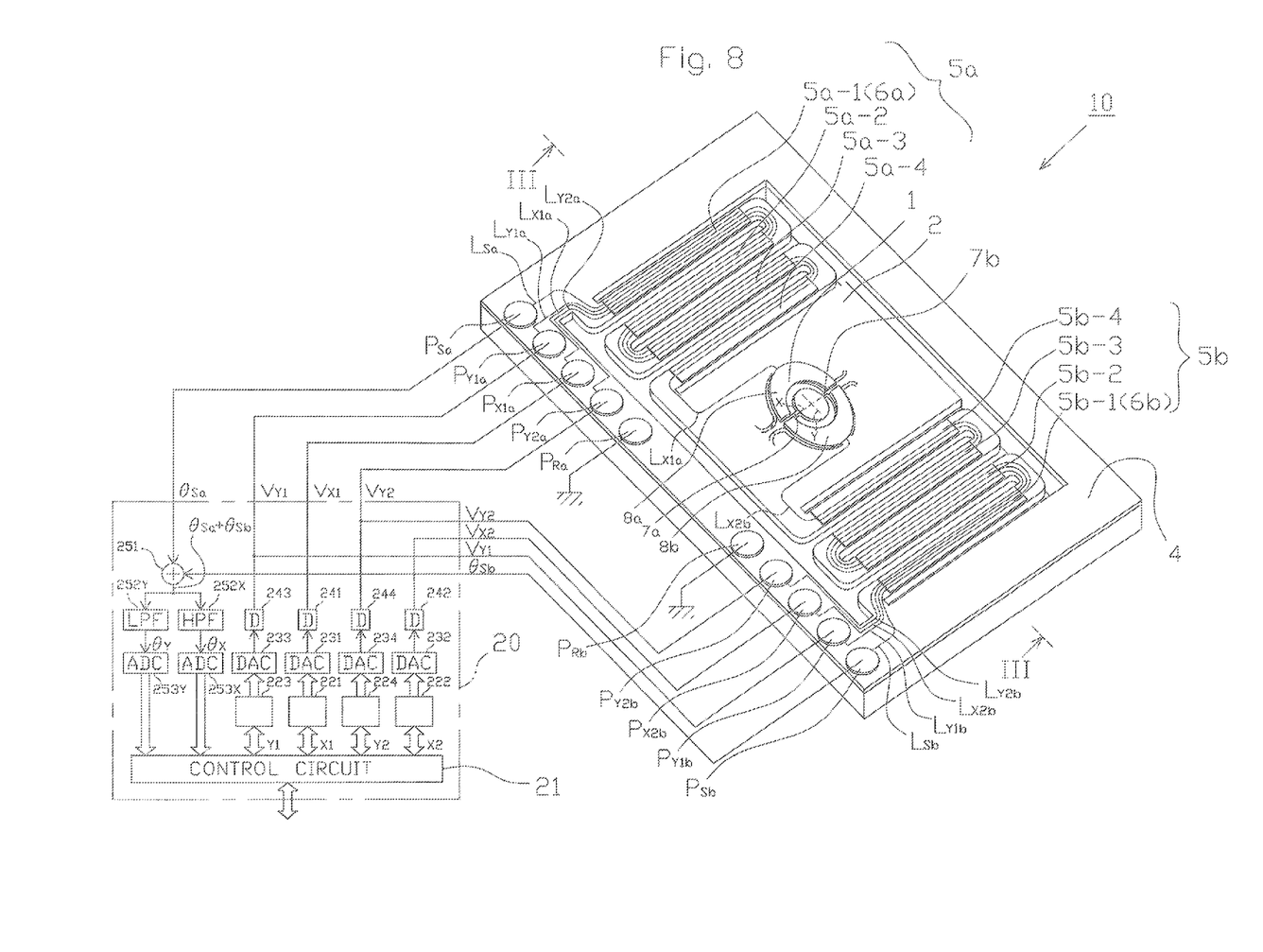
FIG. 8 is a view illustrating a second embodiment of the optical deflector according to the presently disclosed subject matter.

In FIG. 8, which illustrates a second embodiment of the two-dimensional optical deflector according to the presently disclosed subject matter, the cross-sectional views of the optical deflector 10 of FIG. 8 are similar to those of the two-dimensional optical deflector 10 of FIG. 1, and therefore, they are omitted.

In the optical deflector 10 of FIG. 8, the pair of the meander-type inner piezoelectric actuators 3a and 3b of FIG. 1 are replaced by a pair of torsion bars 7a and 7b and a pair of inner piezoelectric actuators 8a and 8b.

The meander-type inner piezoelectric actuators 3a and 3b of FIG. 1 are of a non-resonance type, but the inner piezoelectric actuators 8a and 8b associated with the torsion bars 7a and 7b of FIG. 8 are of a resonance type. That is, when the rocking frequency $f_X$ of the torsion-bar type inner piezoelectric actuators 8a and 8b is close to the natural frequency of a mechanically-vibrating system of the mirror 1 with respect to the X-axis depending upon the structure of the inner piezoelectric actuators 8a and 8b, the deflection angle of the mirror 1 with respect to the X-axis can be increased.

Also, the mirror 1 is circular, and the inner piezoelectric actuators 8a and 8b are ring-shaped to surround the mirror 1 with a slit.

The torsion bars 7a and 7b are arranged along the X-axis, and have ends coupled to the inner circumference of the movable frame 2 and other ends coupled to the outer circumference of the mirror 1. Therefore, the torsion bars 7a and 7b are twisted by the inner piezoelectric actuators 8a and 8b to rock the mirror 1 with respect to the X-axis.

The inner piezoelectric actuators 8a and 8b oppose each other along the Y-axis and sandwich the torsion bars 7a and 7b. The inner piezoelectric actuators 8a and 8b have ends coupled to the inner circumference of the movable frame 2 and other ends coupled to the torsion bars 7a and 7b. In this case, the flexing direction of the inner piezoelectric actuator 8a is opposite to that of the inner piezoelectric actuator 8b.

In the second embodiment, the drive voltages $V_{Y1}$ and $V_{Y2}$ can be saw-tooth-shaped.

Figure 9:
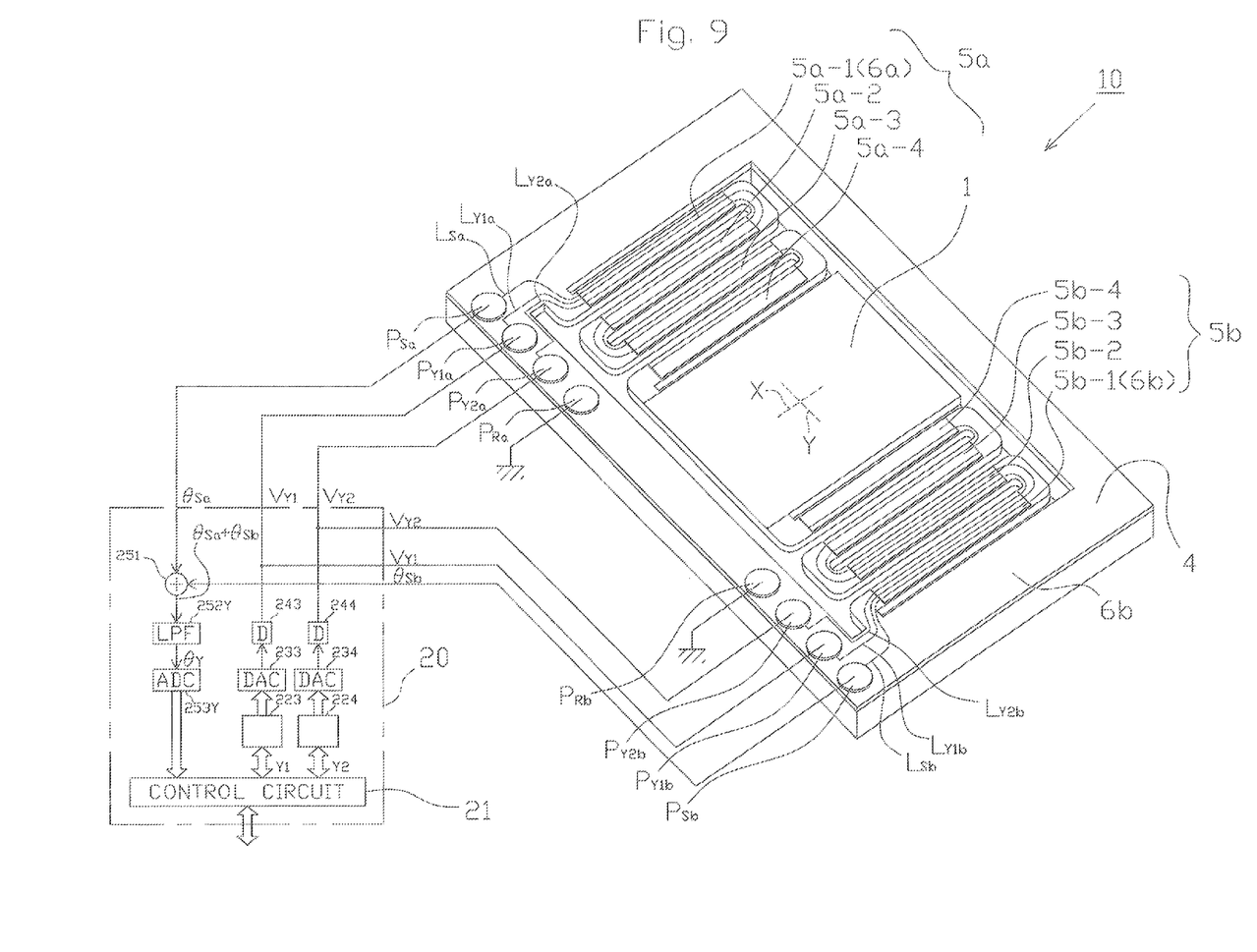
FIG. 9 is a view illustrating a modification of the optical deflector of FIG. 1.

Also, in the above-described embodiments, before the operation of the optical deflectors of FIGS. 1, 8 and 9, it is preferable to perform a so-called poling process using an electric field of 5V/μm upon the PZT layer 206 for 5 minutes or more, thus establishing a stable spontaneous polarization in the PZT layer 6, which would invite large flexing amounts in the piezoelectric actuators.

In the above-described embodiments, AC drive voltages such as sinusoidal or saw-tooth-shaped drive voltages are applied to the piezoelectric actuators 3 a, 3 b, 5 a and 5 b; however, DC drive voltages can be applied to the piezoelectric actuators 3 a, 3 b, 5 a and 5 b. In this case, the flexing amounts of the piezoelectric actuators 3 a, 3 b, 5 a and 5 b are linearly changed in accordance with the DC voltages.

Also, in the above-described embodiments, two piezoelectric sensors 6a and 6b are provided; however, only one piezoelectric sensor, or three or more piezoelectric sensors can be provided on the support body 4.

Still further, the presently disclosed subject matter can be applied to a one-dimensional optical deflector as illustrated in FIG. 9. In FIG. 9, the movable frame 2 and the inner piezoelectric actuators 3a and 3b of FIG. 1 are not provided, and the outer piezoelectric actuators 5a and 5b are fixed directly to the mirror 1. Also, in the driver 20, the nonvolatile memories 221 and 222, the DACs 231 and 232, the drive circuits 241 and 242, the high pass filter 252X and the ADC 253X of FIG. 1 are not provided.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
a mirror;
a movable frame supporting said mirror;
a first piezoelectric actuator, connected between said movable flame and said mirror, for rocking said mirror with respect to a first axis of said mirror;
a support body supporting said movable frame;
a second piezoelectric actuator, connected between said support body and said movable frame, for rocking said mirror through said movable frame with respect to a second axis of said mirror; and
only first and second piezoelectric sensors for sensing rocking vibrations of said mirror caused by said first and second piezoelectric actuators,
said second piezoelectric actuator comprising a pair of second meander-type piezoelectric actuators opposite to each other with respect to said first axis,
each of said second meander-type piezoelectric actuators comprising a plurality of piezoelectric cantilevers folded at every cantilever and connected from said support body to said movable frame, each of said piezoelectric cantilevers being in parallel with said first axis,
said first piezoelectric sensor being incorporated into an outermost one of said piezoelectric cantilevers of one of said pair of meander-type piezoelectric actuators
said second piezoelectric sensor being incorporated into an outermost one of said piezoelectric cantilevers of another of said pair of meander-type piezoelectric actuators,
no piezoelectric sensor being provided in other piezoelectric cantilevers other than said outermost piezoelectric cantilevers, wherein the outermost piezoelectric cantilever comprises:
a lower electrode layer; and
a first piezoelectric layer formed on said lower electrode, and
wherein each of said first and second piezoelectric sensors comprises:
a second piezoelectric layer formed on said lower electrode layer; and
a second upper electrode layer formed on said second piezoelectric layer,
a width ratio of said second piezoelectric layer to said first piezoelectric layer being from 1/4 to 2/3.

2. The optical deflector as set forth in claim 1, wherein said outermost piezoelectric cantilever further comprises:
a first upper electrode layer formed on said first piezoelectric layer, and
wherein each of said first and second piezoelectric sensors further comprises:
a second upper electrode layer formed on said second piezoelectric layer.

3. The optical deflector as set forth in claim 1, wherein said second axis is perpendicular to said first axis.

4. The optical deflector as set forth in claim 1, wherein said first piezoelectric actuator comprises a pair of first meander-type piezoelectric actuators opposite to each other with respect to said second axis,
each of said first meander-type piezoelectric actuators comprising a plurality of piezoelectric cantilevers folded at every cantilever and connected from said movable frame to said mirror, each of said piezoelectric cantilevers being in parallel with said second axis.

5. The optical deflector as set forth in claim 1, further comprising torsion bars connected between said movable frame and said mirror,
said first piezoelectric actuator being connected via said torsion bars to said mirror and being adapted to twist said torsion bars to rock said mirror.

6. An optical deflector comprising:
a mirror;
a support body supporting said mirror;
a piezoelectric actuator, connected between said support body and said mirror, for rocking said mirror with respect to an axis of said mirror; and
only first and second piezoelectric sensor sensors for sensing a rocking vibration of said mirror caused by said piezoelectric actuator,
said piezoelectric actuator comprising a pair of meander-type piezoelectric actuators opposite to each other with respect to said mirror,
each of said meander-type piezoelectric actuators comprising a plurality of piezoelectric cantilevers folded at every cantilever and connected from said support body to said mirror, each of said piezoelectric cantilevers being perpendicular to said axis,
said first piezoelectric sensor being incorporated into an outermost one of said piezoelectric cantilevers of one of said meander-type piezoelectric actuators:
said second piezoelectric sensor being incorporated into an outermost one of said piezoelectric cantilevers of another of said pair of meander-type piezoelectric actuators, no piezoelectric sensor being provided in other piezoelectric cantilevers other than said outermost piezoelectric cantilevers wherein the outermost piezoelectric cantilever comprises:
a lower electrode layer; and
a first piezoelectric layer formed on said lower electrode, and
wherein each of said first and second piezoelectric sensors comprises:
a second piezoelectric layer formed on said lower electrode layer; and
a second upper electrode layer formed on said second piezoelectric layer,
a width ratio of said second piezoelectric layer to said first piezoelectric layer being from 1/4 to 2/3.

7. The optical deflector as set forth in claim 6, wherein said outermost piezoelectric cantilever comprises:
a first upper electrode layer formed on said first piezoelectric layer, and
wherein said piezoelectric sensor further comprises:
a second upper electrode layer formed on said second piezoelectric layer.

8. An optical deflector comprising:
a mirror;
a movable frame supporting said mirror;
a first piezoelectric actuator, connected between said movable frame and said mirror, for rocking said mirror with respect to a first axis of said mirror;
a support body supporting said movable frame;
a second piezoelectric actuator, connected between said support body and said movable frame, for rocking said mirror through said movable frame with respect to a second axis of said mirror; and
only one piezoelectric sensor for sensing rocking vibrations of said mirror caused by said first and second piezoelectric actuators,
said second piezoelectric actuator comprising a pair of second meander-type piezoelectric actuators opposite to each other with respect to said first axis,
each of said second meander-type piezoelectric actuators comprising a plurality of piezoelectric cantilevers folded at every cantilever and connected from said support body to said movable frame, each of said piezoelectric cantilevers being in parallel with said first axis,
said piezoelectric sensor being incorporated into an outermost one of said piezoelectric cantilevers of one of said pair of meander-type piezoelectric actuators,
no piezoelectric sensor being provided in other piezoelectric cantilevers other than said outermost piezoelectric cantilever, wherein the outermost piezoelectric cantilever comprises:
a lower electrode layer; and
a first piezoelectric layer formed on said lower electrode, and
wherein each of said first and second piezoelectric sensors comprises:
a second piezoelectric layer formed on said lower electrode layer; and
a second upper electrode layer formed on said second piezoelectric layer,
a width ratio of said second piezoelectric layer to said first piezoelectric layer being from 1/4 to 2/3.

9. An optical deflector comprising:
a mirror;
a support body supporting said mirror;
a piezoelectric actuator, connected between said support body and said mirror, for rocking said mirror with respect to an axis of said mirror; and
only one piezoelectric sensor for sensing a rocking vibration of said mirror caused by said piezoelectric actuator,
said piezoelectric actuator comprising a pair of meander-type piezoelectric actuators opposite to each other with respect to said mirror,
each of said meander-type piezoelectric actuators comprising a plurality of piezoelectric cantilevers folded at every cantilever and connected from said support body to said mirror, each of said piezoelectric cantilevers being perpendicular to said axis,
said piezoelectric sensor being incorporated into an outermost one of said piezoelectric cantilevers of one of said meander-type piezoelectric actuators,
no piezoelectric sensor being provided in other piezoelectric cantilevers other than said outermost piezoelectric cantilever, wherein the outermost piezoelectric cantilever comprises:
a lower electrode layer; and
a first piezoelectric layer formed on said lower electrode, and
wherein each of said first and second piezoelectric sensors comprises:
a second piezoelectric layer formed on said lower electrode layer; and
a second upper electrode layer formed on said second piezoelectric layer,
a width ratio of said second piezoelectric layer to said first piezoelectric layer being from 1/4 to 2/3.

* * * * *